US008298082B2

(12) United States Patent
Asami

(10) Patent No.: US 8,298,082 B2
(45) Date of Patent: Oct. 30, 2012

(54) GAME DEVICE, PROGRESS CONTROL METHOD, INFORMATION RECORDING MEDIUM, AND PROGRAM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 358 days.

(21) Appl. No.: 12/531,857

(22) PCT Filed: Mar. 3, 2008

(86) PCT No.: PCT/JP2008/053757
§ 371 (c)(1),
(2), (4) Date: Sep. 17, 2009

(87) PCT Pub. No.: WO2008/114601
PCT Pub. Date: Sep. 25, 2008

(65) Prior Publication Data
US 2010/0120535 A1    May 13, 2010

(30) Foreign Application Priority Data

Mar. 20, 2007    (JP) ................................. 2007-071781

(51) Int. Cl.
*A63F 9/24*    (2006.01)
(52) U.S. Cl. ........................................................ 463/36
(58) Field of Classification Search ................... 463/36, 463/37
See application file for complete search history.

(56) References Cited

U.S. PATENT DOCUMENTS

| | | | | |
|---|---|---|---|---|
| 4,417,278 A * | 11/1983 | Hensleigh et al. | ............... | 725/25 |
| 5,521,652 A * | 5/1996 | Shalvi | ............................ | 348/819 |
| 2002/0085097 A1* | 7/2002 | Colmenarez et al. | ......... | 348/211 |
| 2002/0144259 A1* | 10/2002 | Gutta et al. | ...................... | 725/10 |
| 2004/0204230 A1* | 10/2004 | Kazama et al. | .................. | 463/24 |
| 2006/0105836 A1* | 5/2006 | Walker et al. | ................... | 463/25 |
| 2006/0148571 A1* | 7/2006 | Hossack et al. | ................. | 463/43 |
| 2006/0247041 A1* | 11/2006 | Walker et al. | ................... | 463/29 |

(Continued)

FOREIGN PATENT DOCUMENTS

JP    09-166417    6/1997

(Continued)

OTHER PUBLICATIONS

International Search Report of May 13, 2009 for Application No. PCT/JP2008/053757, 3 pages.

*Primary Examiner* — Corbett B Coburn
(74) *Attorney, Agent, or Firm* — Howard & Howard Attorneys PLLC

(57) ABSTRACT

An information processing device (100) (game device) sequentially measures the distance between a display (290) and a controller (210). When the distance is equal to or smaller than an alerting distance, the information processing device determines that a player operating the controller (210) has come too close to the display (290), and suspends the progress of a game. After this, when the distance becomes equal to or larger than a release distance, the information processing device (100) determines that the player has gone sufficiently away from the display (290) and resumes the progress of the game. At this time, the information processing device (100) resumes the progress of the game by rewinding the progress by a certain stretch of time so that the player can easily continue the suspended game.

15 Claims, 12 Drawing Sheets

U.S. PATENT DOCUMENTS

| | | | |
|---|---|---|---|
| 2006/0287087 A1* | 12/2006 | Zalewski et al. | 463/37 |
| 2007/0060336 A1* | 3/2007 | Marks et al. | 463/30 |
| 2007/0061851 A1* | 3/2007 | Deshpande et al. | 725/88 |
| 2007/0117625 A1* | 5/2007 | Marks et al. | 463/30 |
| 2008/0051197 A1* | 2/2008 | Jawad et al. | 463/37 |
| 2008/0261693 A1* | 10/2008 | Zalewski | 463/31 |

FOREIGN PATENT DOCUMENTS

| | | |
|---|---|---|
| JP | 11-042368 | 2/1999 |
| JP | 2000-005448 | 1/2000 |
| JP | 2001-087544 | 4/2001 |
| JP | 2005-021563 | 1/2005 |
| JP | 2005-034216 | 2/2005 |

* cited by examiner

GAME DEVICE, PROGRESS CONTROL METHOD, INFORMATION RECORDING MEDIUM, AND PROGRAM

TECHNICAL FIELD

The present invention relates to a game device, a method for controlling a progress, an information recording medium, and a program that can appropriately prevent a player from coming too close to a display device.

BACKGROUND ART

Conventionally, there have been known game devices (video game devices, etc.) in which players control a mock gun and shoot a target or the like displayed on a screen. One type of such game devices uses a cathode ray tube display and this is described for example: when the player points the mock gun at the screen and pulls the trigger, the game devices cause the screen to flash (display a flashing image) only for an instant. The flashing light is then detected by a sensor provided on the muzzle or other part of the mock gun, and the position of the gun sight on the screen (the position aimed at by the player) is obtained based on the timing in the raster scan at the time of this detection.

The recently disclosed techniques of game devices have achieved enhanced reality of shooting, not only by displaying a target, etc. on a main screen, such as a display, but also by displaying a sub screen on a sighting device (a scope for taking a sight) provided on the mock gun (see, for example, Patent Literature 1).

Patent Literature 1: Unexamined Japanese Patent Application KOKAI Publication No. 2001-87544 (pp. 4-11, FIG. 1).

DISCLOSURE OF INVENTION

Problem to be Solved by the Invention

Another recent game device having appeared on the market has adopted an input device of a new concept as its standard controller, without using the above-mentioned kind of dedicated mock gun, and enjoys popularity, This controller has an appearance similar to a remote control of a television set, etc., and is connectable to the game device wirelessly (via radio communication, etc.) and operable by a player in one hand.

Players can enjoy a shooting game or the like by pointing this controller, instead of a conventional mock gun, at the screen, aiming at an intended target or so, and pressing a trigger button.

Not only shooting games, but games of various genres that make use of the feature of such a controller are being created.

In the games using such a controller, players can play intuitively, feel greater sensory pleasure, and be absorbed in the game, often coming close to the display device unawarely.

If the players come too close to the display device, the players might worsen their vision, or cause the controller to come into contact with the display device.

Therefore, there has been a demand for a solution for preventing the players from coming too close to the display device.

The present invention was made to solve such a problem, and an object of the present invention is to provide a game device, a method for controlling progress, an information recording medium, and a program that can appropriately prevent a player from coming too close to a display device.

Means for Solving the Problem

A game device according to a first aspect of the present invention is a game device that progresses a game in accordance with an operation to a controller that is used by being pointed to a display device, and includes a distance measuring unit, a suspension control unit, and a resume control unit.

First, the distance measuring unit sequentially measures the distance between the display device and the controller. The suspension control unit suspends the progress of the game when the measured distance becomes smaller than a prescribed value. Then, when the distance measured after the progress was suspended becomes larger than a prescribed value, the resume control unit resumes the progress of the game by rewinding the progress by a predetermined stretch of time from where the progress was suspended.

That is, when the distance between the display device and the controller becomes smaller than a prescribed value, it is determined that the player has come too close to the display device, and the progress of the game is suspended. Then, when the measured distance becomes larger than a prescribed value, it is determined that the player is sufficiently away from the display device and the progress of the game is resumed from a point that is predetermined stretch of time back. Hence, when the progress of the game is suspended, the player can be aware of coming too close to the display device and is reminded to be away from the display device. When the player is sufficiently away, the progress of the game is resumed from a point that is slightly ahead of the time from where the progress was suspended. Therefore, the player can grasp the situation before the progress was suspended, and continue the game from where the progress was suspended with no difficulty.

Hence, it is possible to appropriately prevent the player from coming too close to the display device.

A game device according to a second aspect of the present invention is a game device that progresses a game in accordance with an operation to a controller that is used by being pointed to a display device, and includes a prescribed value storage unit, a position information acquiring unit, distance measuring unit, a suspension control unit, and a resume control unit.

First, the prescribed value storage unit stores a first prescribed value (e.g., an alerting distance) that defines a closest distance, which is a distance that exists between the display device and the controller when they get closest to each other, and a second prescribed value (e.g., a release distance) that is larger by a predetermined distance than the first prescribed value. The position information acquiring unit sequentially acquires position information of the controller that is pointed to the display device. Then, the distance measuring unit sequentially measures the distance between the display device and the controller based on the acquired position information.

The suspension control unit suspends the progress of the game when the measured distance becomes smaller than the stored first prescribed value. Then, when the distance measured after the progress was suspended becomes larger than the stored second prescribed value, the resume control unit resumes the progress of the game by rewinding the progress by a predetermined stretch of time from the time the progress was suspended.

That is, when the distance between the display device and the controller becomes smaller than the alerting distance, it is determined that the player has come too close to the display device, and the progress of the game is suspended. Then, when the measured distance becomes larger than the release distance, it is determined that the player has sufficiently come away from the display device, and the progress of the game is resumed from a predetermined stretch of time back. Hence, when the progress of the game is suspended, the player can be aware of having come too close to the display device, and is reminded to be away from the display device. When the player has come away sufficiently, the progress of the game is resumed from slightly ahead of the time the progress was suspended. Therefore, the player can grab the situation before the progress was suspended, and can continue the game from where the progress was suspended with no difficulty.

Hence, it is possible to appropriately prevent the player from coming too close to the display device.

A game device according to a third aspect of the present invention is a game device that progresses a game in accordance with an operation to a controller that is used by being pointed to a display device, and includes a position information acquiring unit, a distance measuring unit, a suspension control unit, a time counting unit, and a resume control unit.

First, the position information acquiring unit sequentially acquires position information of the controller that is pointed to the display device. The distance measuring unit sequentially measures a distance between the display device and the controller based on the acquired position information.

The suspension control unit suspends the progress of the game when the measured distance becomes smaller than a prescribed value. The time counting unit counts a time duration during which the distance measured after the progress was suspended is being larger than a prescribed value. In a case where the counted time duration lasts for a certain stretch of time, the resume control unit resumes the progress of the game by rewinding the progress by a predetermined stretch of time from the time the progress was suspended.

That is, when the distance between the display device and the controller becomes smaller than a prescribed value, it is determined that the player has come too close to the display device, and the progress of the game is suspended. Then, when the measured distance becomes larger than a prescribed value and if this distance is maintained for a certain stretch of time, it is determined that the player has sufficiently come away from the display device, and the progress of the game is resumed from a predetermined stretch of time back. Hence, when the progress of the game is suspended, the player can notice that he/she has come too close to the display device, and is reminded to be away from the display device. When the player has come away sufficiently, the progress of the game is resumed from slightly ahead of the time the progress was suspended. Therefore, the player can grasp the situation before the progress was suspended, and can continue the game from where the progress was suspended with no difficulty.

Hence, it is possible to appropriately prevent the player from coming too close to the display device.

The game device described above may further include an instruction information receiving unit that sequentially receives instruction information from the controller, and an instruction information nullifying unit that nullifies any received instruction information during a stretch of time from when the resume control unit resumes the progress of the game after once the suspension control unit suspended the progress until when the game progresses to the time its progress was suspended.

In this case, it is possible to arrange that no input operation should be received during reproduction (replay). Hence, it is possible to prevent occurrence of a problem that the progress might advance in a different way from it did before the progress was suspended (a problem that it becomes possible to give an intentional do-over from a while back) or a like problem.

The game device described above may further include an image generating unit that sequentially generates an image of the game to be displayed on the display device, and a display format changing unit that changes the display format of an image to be displayed during a stretch of time from when the resume control unit resumes the progress of the game after once the suspension control unit suspended the progress until when the game progresses to the time its progress was suspended.

In this case, by changing the display format by, for example, darkening the screen, it is possible to notify the player that reproduction (replaying) is ongoing.

A progress control method according to a fourth aspect of the present invention is a progress control method for a game device that progresses a game in accordance with an operation to a controller that is used by being pointed to a display device, and includes a distance measuring step, a suspend controlling step, and a resume controlling step.

First, at the distance measuring step, the distance between the display device and the controller is sequentially measured. At the suspension controlling step, the progress of the game is suspended when the measured distance becomes smaller than a prescribed value. Then, at the resume controlling step, when the distance measured after the progress was suspended becomes larger than a prescribed value, the progress of the game is wound back by a predetermined stretch of time from the time it was suspended, and is resumed from there.

That is, when the distance between the display device and the controller becomes smaller than a prescribed value, it is determined that the player has come too close to the display device, and the progress of the game is suspended. Then, when the measured distance becomes larger than a prescribed value, it is determined that the player has sufficiently come away from the display device, and the progress of the game is resumed from a predetermined stretch of time back. Hence, when the progress of the game is suspended, the player can notice that he/she has come too close to the display device, and is reminded to be away from the display device. When the player has come away sufficiently, the progress of the game is resumed from slightly ahead of the time the progress was suspended. Therefore, the player can grasp the situation before the progress was suspended and can continue the game from where the progress was suspended with no difficulty.

Hence, it is possible to appropriately prevent the player from coming too close to the display device.

An information recording medium according to a fifth aspect of the present invention stores a program that controls a computer (may be an electronic device) to function as the game device described above.

A program according to a sixth aspect of the present invention is configured to control a computer (may be an electronic device) to function as the game device described above.

This program may be recorded on a computer-readable information recording medium such as a compact disk, a flexible disk, a hard disk, a magneto-optical disk, a digital video disk, a magnetic tape, a semiconductor memory, etc.

The above program may be distributed or sold via a computer communication network independently from a computer on which the program is to be executed. The above information recording medium may be distributed or sold independently from the computer.

Effect of the Invention

According to the present invention, it is possible to appropriately prevent a player from coming too close to a display device.

EXPLANATION OF REFERENCE NUMERALS

Figure 1:
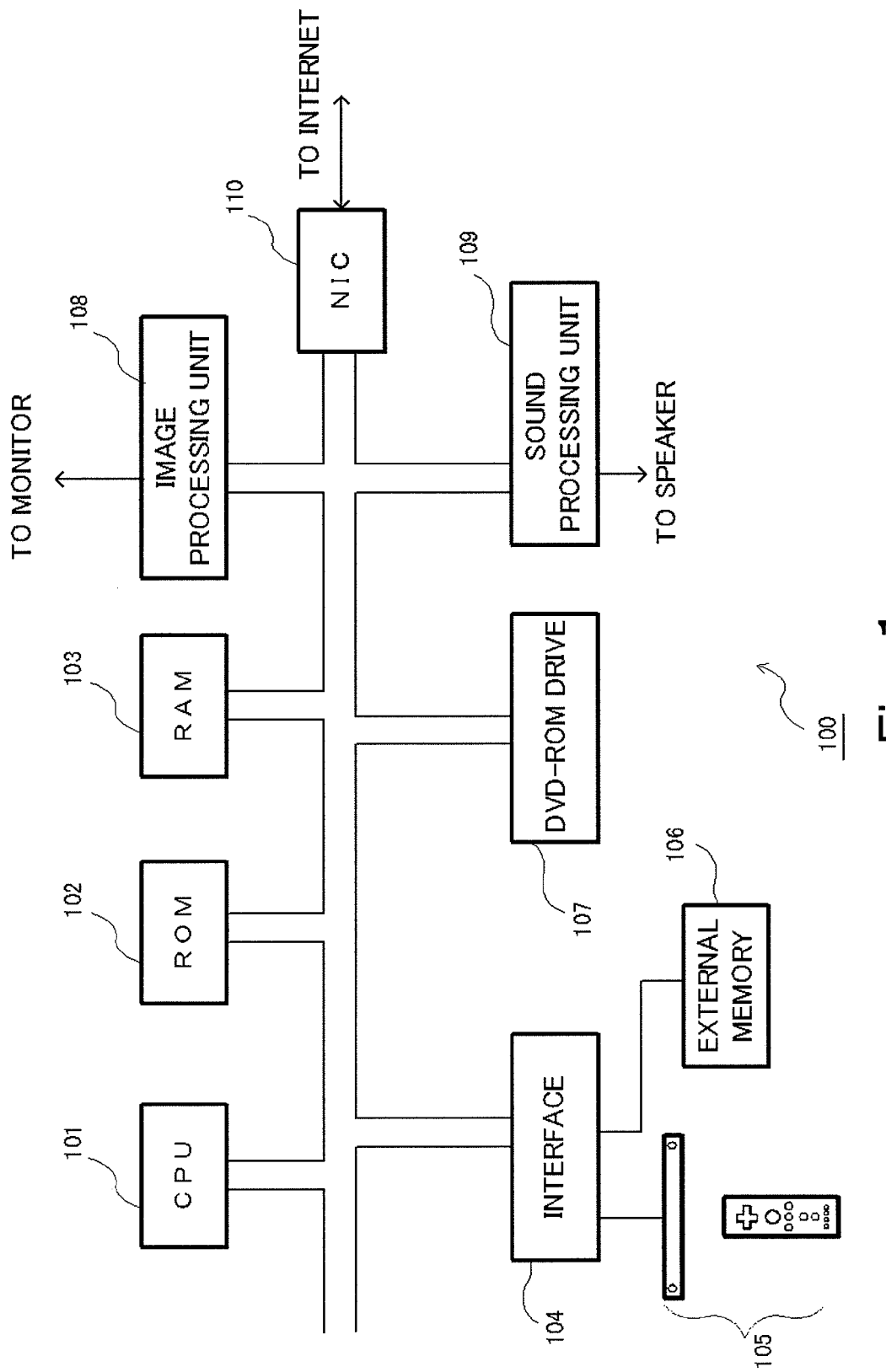
FIG. 1 is a schematic diagram showing a schematic configuration of an information processing device according to an embodiment of the present invention.

100 information processing device
101 CPU
102 ROM
103 RAM
104 interface
105 controller unit
106 external memory
107 DVD-ROM drive
108 image processing unit
109 sound processing unit
110 NIC
210 controller
220 sensor bar
300, 500 game device
310 wireless communication unit
320 position information acquiring unit
330 operation information acquiring unit
340, 540 process control unit
350 operation instruction storage unit
360 image information storage unit
370 image generating unit

BEST MODE FOR CARRYING OUT THE INVENTION

Embodiments of the present invention will now be explained below. For easier understanding, embodiments in which the present invention is applied to a game device will be explained below, but the present invention can likewise be applied to such information processing devices as computers of various kinds, Personal Data Assistants (PDA), cellular phones, etc. That is, the embodiments explained below are intended for illustration, not to limit the scope of the present invention. Hence, although those skilled in the art could employ embodiments obtained by replacing individual components or all the components of the embodiments below with equivalents of those, such embodiments will also be included in the scope of the present invention.

Embodiment 1

FIG. 1 is a schematic diagram showing a schematic configuration of a typical information processing device by which a game device according to an embodiment of the present invention is realized. The following explanation will be given with reference to FIG. 1.

An information processing device 100 includes a Central Processing Unit (CPU) 101, a Read Only Memory (ROM) 102, a Random Access Memory (RAM) 103, an interface 104, a controller unit 105, an external memory 106, a Digital Versatile Disk (DVD)-ROM drive 107, an image processing unit 108, a sound processing unit 109, and a Network Interface Card (NIC) 110.

When a DVD-ROM that stores a game program and data is inserted to the DVD-ROM drive 107 and the information processing device 100 is powered on, the program is executed and the game device according to the present embodiment is realized.

The CPU 101 controls the operation of the whole information processing device 100, and is connected to each component to exchange control signals and data with it.

An Initial Program Loader (IPL), which is executed immediately after the power is turned on, is stored in the ROM 102, and when executed, makes a program stored on a DVD-ROM be read into the RAM 103 and executed by the CPU 101. Further, an operating system program and various data that are necessary for controlling the operation of the whole information processing device 100 are stored in the ROM 102.

The RAM 103 is for a temporary memory of data and programs, and retains a program and data read out from a DVD-ROM and data necessary for game progressing and chat communications.

The controller unit 105 connected via the interface 104 receives an operation input given by a user for playing a game. To be more specific, the controller unit 105 receives via wireless communication, operation information regarding an operation made by a player to a controller 210, which will be described later. The details of the controller unit 105 will be described later.

The external memory 106 detachably connected via the interface 104 rewritably stores data representing a progress status of a game, log (record) data of chat communications, etc. As needed, a user can record such data into the external memory 106 by entering an instruction input via the controller unit 105.

A DVD-ROM to be mounted on the DVD-ROM drive 107 stores a program for realizing a game and image data and sound data that accompany the game. Under the control of the CPU 101, the DVD-ROM drive 107 performs a reading process to the DVD-ROM mounted thereon to read out a necessary program and data, which are to be temporarily stored in the RAM 103, etc.

The image processing unit 108 processes data read out from a DVD-ROM by means of the CPU 101 and an image calculation processor (unillustrated) possessed by the image processing unit 108, and records the processed data in a frame memory (unillustrated) possessed by the image processing unit 108. Image information recorded in the frame memory is converted to video signals (image signals) at predetermined synchronization timings and output to a monitor (a display 290 described later) connected to the image processing unit 108. This enables various types of image display.

The image calculation processor can perform, at a high speed, overlay calculation of two-dimensional images, transparency calculation such as a blending, etc., and various saturation calculations.

The image calculation processor can also perform a high-speed calculation of rendering polygon information that is disposed in a virtual three-dimensional space and affixed with various texture information by Z buffering and obtaining a rendered image of the polygon disposed in the virtual three-dimensional space as seen downwardly from a predetermined view position.

Furthermore, the CPU 101 and the image calculation processor can operate in cooperation to depict a sequence of letters as a two-dimensional image in the frame memory or on each polygon surface in accordance with font information that defines the shape of the letters. The font information is stored in the ROM 102, but dedicated font information stored in a DVD-ROM may be used.

The sound processing unit 109 converts sound data read out from a DVD-ROM into an analog sound signal and supplies the analog sound signal to an external speaker (a speaker of a display 290 described later) to output a sound. For example, under the control of the CPU 101, the sound processing unit 109 generates a sound effect or music data that shall be released in the progress of a game, and outputs a sound corresponding to the data from the speaker.

The NIC 110 connects the information processing device 100 to a computer communication network (unillustrated) such as the Internet, etc. The NIC 110 is constituted by a 10BASE-T/100BASE-T product used for building a Local Area Network (LAN), an analog modem, an Integrated Services Digital Network (ISDN) modem, or an Asymmetric Digital Subscriber Line (ADSL) modem for connecting to the Internet via a telephone line, a cable modem for connecting to the Internet via a cable television line, or the like, and an interface (unillustrated) that intermediates between any of these and the CPU 101.

The game device 100 may use a large capacity external storage device such a hard disk or the like and configure it to serve the same function as the ROM 102, the RAM 103, the external memory 106, a DVD-ROM mounted on the DVD-ROM drive 107, or the like.

It is also possible to employ an embodiment in which a keyboard for receiving an input for editing a letter string from a user, a mouse for receiving a position designation or a selection input of various kinds from a user, etc. are connected.

An ordinary computer (general-purpose personal computer or the like) may be used as the game device instead of the information processing device 100 according to the present embodiment. For example, an ordinary computer includes, likewise the information processing device 100 described above, a CPU a RAM, a ROM, a DVD-ROM drive, and an NIC, an image processing unit with simpler capabilities than those of the information processing device 100, and a hard disk as its external storage device with also compatibility with a flexible disk, a magneto-optical disk, a magnetic tape, etc. Such a computer uses a keyboard, a mouse, etc. instead of a controller as its input device. When a game program is installed on the computer and executed, the computer functions as the game device.

(Overview of the Controller Unit)

Figure 2:
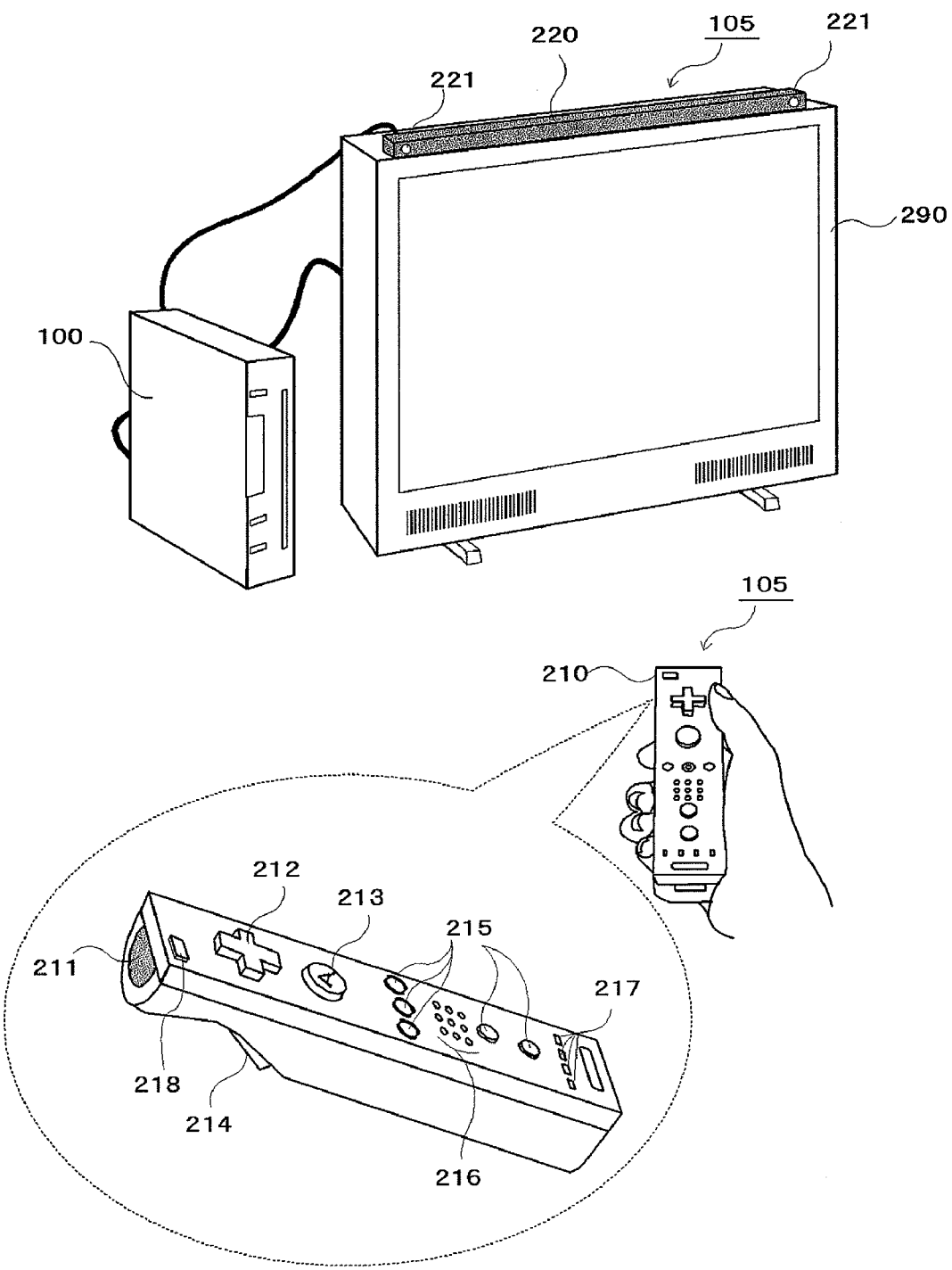
FIG. 2 is an outside drawing for explaining an overview of a controller unit.

FIG. 2 is an outside drawing for explaining the general description of the controller unit 105 mentioned above.

The controller unit 105 includes a controller 210 and a sensor bar 220 as shown in FIG. 2. The information processing device 100 is connected to the sensor bar 220 and to the display 290 through a predetermined cable.

The controller 210 is a controller that has an appearance similar to a remote control of a television set or the like, is connected to the information processing device 100 wirelessly (via wireless communication), and is operable by a player by holding in one hand.

The sensor bar 220 has a shape of a bar having a predetermined length, and is appropriately fixed on the top or other part of the display 290 in alignment with the screen. The sensor bar 220 has at least one light emitting element 221 embedded at each side thereof.

Being supplied with power from the information processing device 100, the sensor bar 220 appropriately causes the light emitting elements 221 to emit light.

A camera 211 that uses an imaging device such as a Charge Coupled Device (CCD), a Complementary Metal Oxide Semiconductor (CMOS), or the like is disposed at the head of the controller 210. When the head of the controller 210 is turned to the display 290, the camera 211 captures an image that includes the plurality of light emitting elements 221 (at least two luminous points) of the sensor bar 220. The controller 210 includes a wireless communication unit inside, and sequentially sends information of captured images to the information processing device 100 via wireless communication.

Then, as needed, the information processing device 100 obtains the position, the facing direction, etc. of the controller 210 based on the positional relationship between the plurality of luminous points in the images sent from the controller 210, etc. For example, the CPU 101, the image processing unit 108, etc. analyze the positional relationship between the plurality of luminous points, etc. as seen from the controller 210, calculates the spatial position of the controller 210 and the facing direction of its head (the direction in which its longer axial line runs), and finally obtains the position on the screen a player operates the controller 210 to point to, etc.

Such measurement of the position, etc. of the controller 210 is performed, for example, at each vertical synchronization interrupt (1/60 second).

The controller 210 sequentially sends a status (operation information) of each button as to whether it is pressed, etc. to the information processing device 100 via wireless communication.

Further, the controller 210 includes inside an accelerometer, an angular accelerometer, an inclination sensor, etc., and can measure a movement made by the player, such as a twiddle, etc. The result of such a measurement is also sent to the information processing device 100.

A cross-shaped key 212 is disposed on the top face of the controller 210, and the player can enter various direction instruction inputs, etc. when operating the controller 210 by holding it in one of his/her hand. An "A" button 213 and various buttons 215 are also disposed on the top face, and an instruction input associated with each button can be entered.

On the other hand, a "B" button 214 is disposed on the bottom face of the controller 210, and because the bottom face is recessed, the player can press the "B" button 214 in the manner of pulling a trigger while operating the controller 210 by holding it in one of his/her hand.

A plurality of small holes 216 are provided in the top face of the controller 210 and can output a clear sound from the speaker embedded inside.

An indicator 217 on the top face of the controller 210 timely lights up so that the player can identify his/her controller 210 when a plurality of controllers 210 are used.

A power button 218 provided on the top face of the controller 210 instructs, for example, turning on/off of the information processing device 100.

Further, the controller 210 includes a shaking mechanism such as a vibrator inside, and can generate vibration in response to an instruction sent from the information processing device 100.

The following explanation is based on the premise that the position, etc. of the controller 210 are measured by the combination of the controller 210 and the sensor bar 220. The position of the controller 210 can be measured not only by the method of the CCD camera 211 capturing an image of the luminous points (light emitting elements 221) of the sensor bar 220, but by another method. For example, the position, etc. of the controller 210 may be obtained from a time lag in wireless communication between two points via the sensor bar 220, etc., or the position, etc. of the controller 210 may be obtained according to the principle of triangulation by using an ultrasonic wave, an infrared ray, or the like.

(Schematic Configuration of the Game Device)

Figure 3:
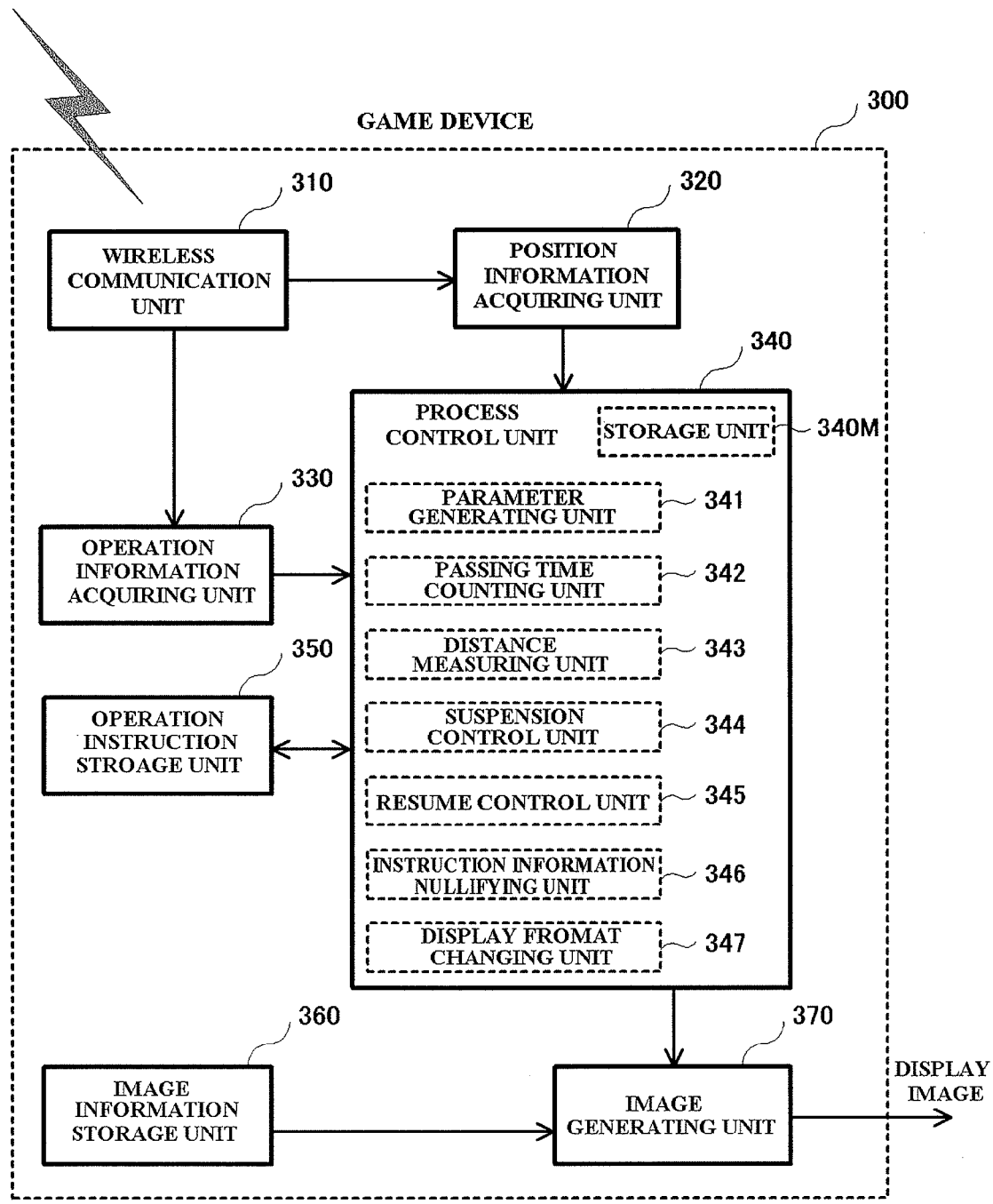
FIG. 3 is a schematic diagram showing a schematic configuration of a game device according to an embodiment of the present invention.

FIG. 3 is a schematic diagram showing a schematic configuration of the game device according to the present embodiment. As an example, this game device is a device that evaluates an operation of a player who operates the controller 210 by pointing the controller 210 to the display 290 (to be more specific, to the sensor bar 220).

Figure 4:
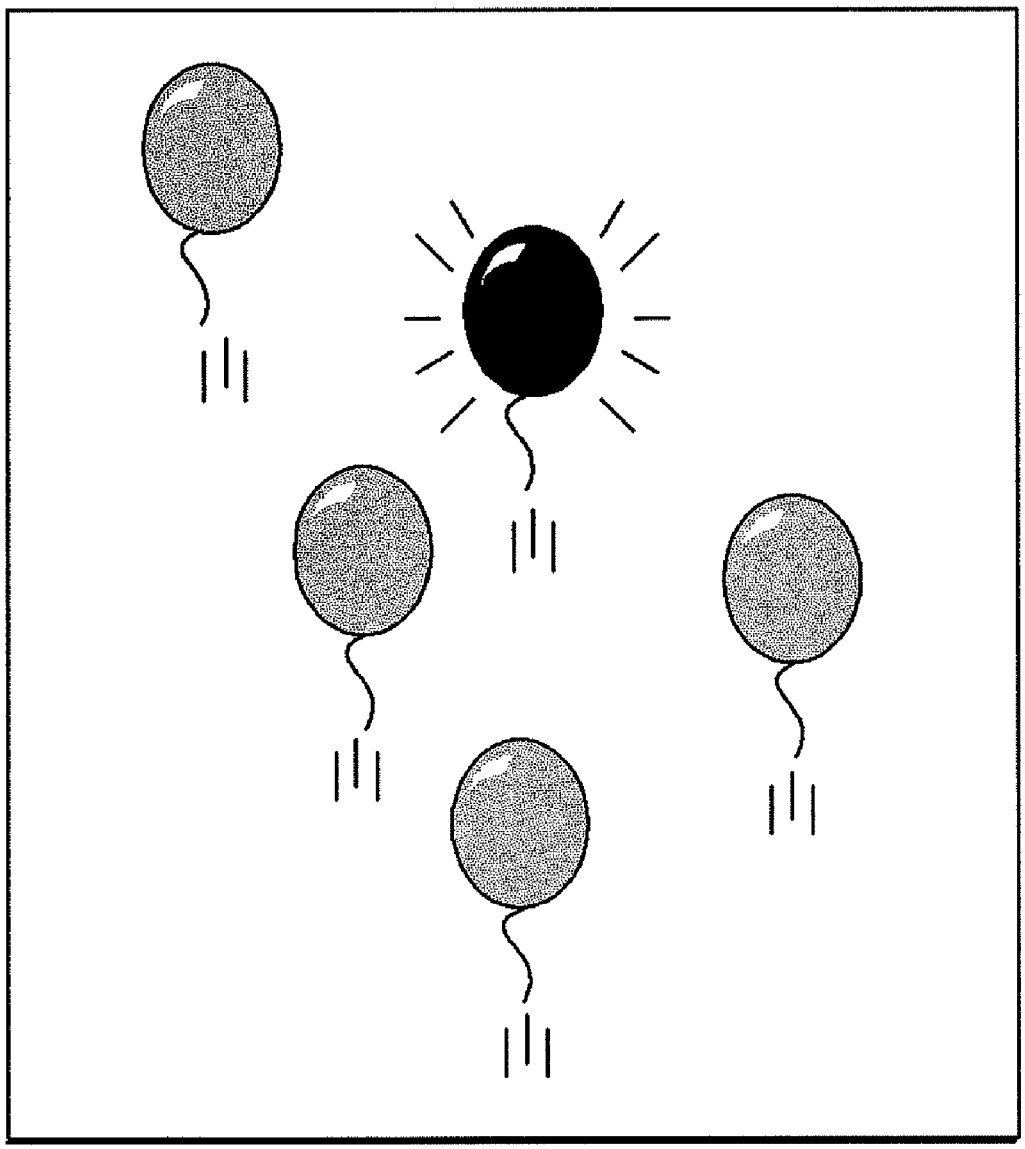
FIG. 4 is a schematic diagram for illustrating an abstract view of a sensory game.

Specifically, this game device is a device on which a sensory game is implemented, in which game, as shown in FIG. 4, a plurality of balloons (balloon objects) that are rising upward (scrolled upward) are displayed, and any of the balloons whose color is changed is shot like the target of a marksmanship game. The game device that executes such a sensory game will be explained with reference to the drawings.

As shown in FIG. 3, the game device 300 includes a wireless communication unit 310, a position information acquiring unit 320, an operation information acquiring unit 330, a process control unit 340, an operation instruction storage unit 350, an image information storage unit 360, and an image generating unit 370.

First, the wireless communication unit 310 successively performs wireless communication with the controller 210, and sends or receives necessary information.

For example, the wireless communication unit 310 receives information sent from the controller 210, and supplies it to the position information acquiring unit 320 and to the operation information acquiring unit 330.

For example, the wireless communication unit 310 supplies information regarding an image captured by the CCD camera 211 and detection information detected by each sensor inside the controller 210 to the position information acquiring unit 320.

Further, when any button (the cross-shaped key 212, the "A" button 213, the "B" button 214, or the like) on the controller 210 is pressed, the wireless communication unit 310 supplies code information, etc. of the pressed button to the operation information acquiring unit 330. Since a twiddle or the like of the controller 210 can likewise be instruction information, detection information detected by the inclination sensor or the like is also supplied to the operation information acquiring unit 330.

The controller unit 105 can function as such a wireless communication unit 310.

The position information acquiring unit 320 sequentially acquires position information including the position, the facing direction (the direction of the head of the controller 210), etc. of the controller 210, based on image information and detection information from each sensor, which are supplied by the wireless communication unit 310.

For example, the position information acquiring unit 320 analyzes the image information and the detection information, and sequentially acquires the spatial position of the controller 210 with respect to the display 290, the facing direction of the head (CCD camera 211) of the controller 210 (the direction in which the longer axial line runs), etc.

The position information acquiring unit 320 generates such position information at, for example, each vertical synchronization interrupt (1/60 second), and sequentially supplies the generated position information to the process control unit 340.

The controller unit 105 and the CPU 101 can function as such a position information acquiring unit 320.

The operation information acquiring unit 330 acquires information regarding an operation (the content of an operation) made by the player, based on code information, etc. of a pressed button supplied by the wireless communication unit 310. That is, the operation information acquiring unit 330 senses which button on the controller 210 is pressed by the player, etc. in real time.

The controller unit 105 and the interface 104 can function as such an operation information acquiring unit 330.

The process control unit 340 includes a storage unit 340M inside, and controls the whole game device 300. For example, the process control unit 340 includes a parameter generating unit 341, a passing time counting unit 342, a distance measuring unit 343, a suspension control unit 344, a resume control unit 345, an instruction information nullifying unit 346, and a display format changing unit 347.

The storage unit 340M stores a value (first prescribed information) representing an alerting distance that is predetermined as a distance (closest distance) of a position at which an alert is output, and a value (second prescribed information) representing a release distance that is longer by a predetermined length than the alerting distance and that is a distance of a position at which the alert is deactivated.

The parameter generating unit 341 generates parameters for progressing the game.

Specifically, the parameter generating unit 341 generates parameters such as the speed at which balloon objects are scrolled, the timing at which balloon objects appear, a choice of a balloon object whose color is to be changed and the timing at which the color is changed, etc. The parameters are generated before the game is started, according to the challenge level of the game, etc.

The passing time counting unit 342 successively counts the passing time (elapse time) since the start of the game. As will be described later, the passing time counting unit 342 stops counting the passing time when the progress of the game is suspended, and when the progress of the game is resumed, rewinds the time by a certain stretch of time and then resumes counting the passing time.

The distance measuring unit 343 sequentially measures the distance between the display 290 (to be more specific, the sensor bar 220) and the controller 210, based on position information sequentially acquired by the position information acquiring unit 320.

The suspension control unit 344 compares the distance measured by the distance measuring unit 343 with the alerting distance stored in the storage unit 340M, and suspends the progress of the game in a case where the measured distance is within the alerting distance.

Figure 5A:
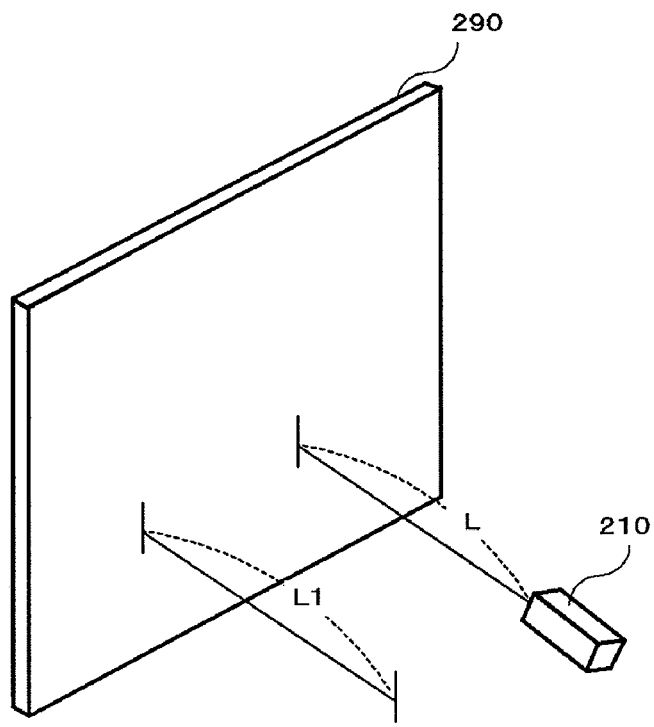
FIG. 5A is a schematic diagram for explaining a relationship regarding a distance between a display and a controller.

For example, as shown in FIG. 5A, in a case where the distance L between the display 290 and the controller 210 is equal to or smaller than the alerting distance L1, the suspension control unit 344 suspends the progress of the game. The alerting distance L1 is prescribed as a distance for determining that the player operating the controller 210 has come too close to the display 290.

That is, when it is determined that the player has come too close to the display 290 from the comparison between the distance L of the controller 210 and the alerting distance L1, the suspension control unit 344 stops the progress of the game.

At this time, the suspension control unit 344 stops the passing time counting unit 342 at the passing time of that instant (retains a passage stop time), stops the game image, and notifies that the player has come too close to the display 290 by combining a predetermined alerting message.

Returning to FIG. 3, the resume control unit 345 compares the distance measured by the distance measuring unit 343 after the suspension control unit 344 suspends the progress of the game with the release distance stored in the storage unit 340M, and resumes the progress of the game in a case where the measured distance is equal to or larger than the release distance.

Figure 5B:
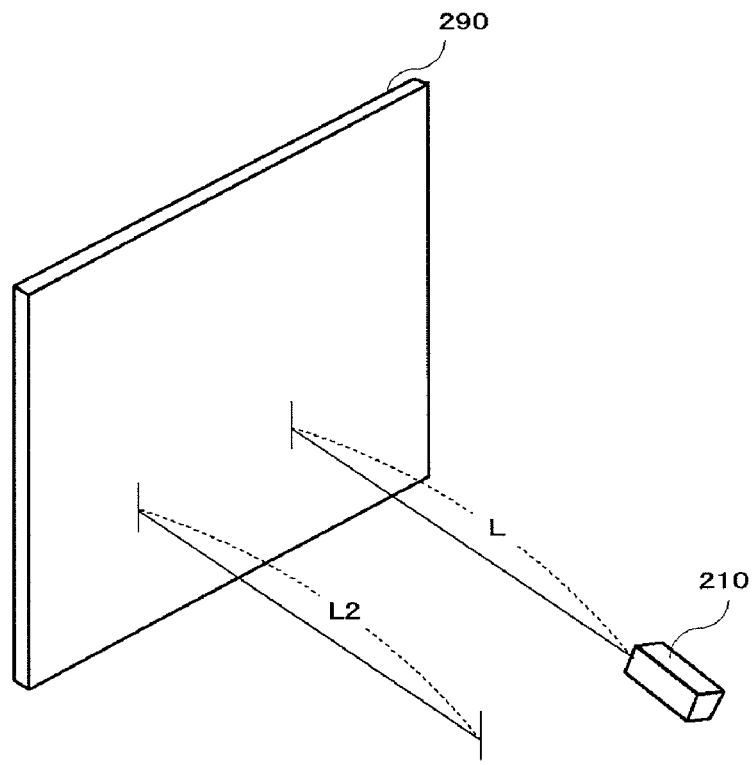
FIG. 5B is a schematic diagram for explaining a relationship regarding a distance between a display and a controller.

For example, as shown in FIG. 5B, in a case where the distance L between the display 290 and the controller 210 is equal to or larger than the release distance L2, the suspension control unit 344 resumes the progress of the game. The release distance L2 is larger than the alerting distance L1 described above, and prescribed as a distance for determining that the player operating the controller 210 is sufficiently away from the display 290.

That is, when it is determined that the player is sufficiently away from the display 290 from the comparison between the distance L of the controller 210 and the release distance L2, the resume control unit 345 sets a time that is rewound from the passage stop time by a certain stretch of time to the passing time counting unit 342 to make the passing time counting unit 342 resume counting time from the set time, and progresses the game.

Here, the time is rewound by a predetermined stretch so that it is easy for the player to continue the suspended game, and a specific stretch of time by which the time is wound back is, for example, about three to five seconds (may be reduced or increased appropriately according to the kind and challenge level of the game).

Even if the resume control unit 345 resumes the progress of the game, the instruction information nullifying unit 346 nullifies any operation instruction received from the controller 210 until the time reaches the suspend time.

That is, if it is possible for the player to give a new operation from the time reached by rewinding from the passage stop time by the certain stretch of time, a problem occurs that the game can progress in a different way from the way it did before the game was suspended. For example, in a case where the player had nearly failed in the operation, the player can intentionally redo the operation from a while back. Hence, the instruction information nullifying unit 346 nullifies and does not receive any operation instruction from the controller 210 from the rewound time until the suspend time (passage stop time). During this period, the resume control unit 345 reproduces the progress of the game based on the operation instructions, etc. stored in the operation instruction storage unit 350 (based on the operation instructions, etc. that were given in the past).

When the reproduction of the progress of the game up to the suspend time is completed, the instruction information nullifying unit 346 stops nullifying operation instructions to be ready to receive operation instructions from the controller 210.

While the operation instruction nullifying unit 346 is nullifying operation instructions, i.e., during the stretch of time from when the game progress is resumed by backtracking back by a certain stretch of time until when the suspend time is reached, the display format changing unit 347 appropriately changes the display format of the game screen to notify the player that the past progress is being reproduced (replayed).

For example, the display format changing unit 347 controls the image generating unit 370, etc. to darken the game screen to a predetermined percentage, or separately display a message that tells that replaying is ongoing.

When the reproduction up to the suspend time is completed, the display format changing unit 347 recovers the normal display format to enable the player to carry on the game from the suspend time.

The CPU 101 can function as such a process control unit 340 configured in this way.

The operation instruction storage unit 350 stores operation information acquired by the operation information acquiring unit 330 in association with the passing time counted by the passing time counting unit 342.

That is, the operation instruction storage unit 350 sequentially stores operation instructions, amounting to a predetermined stretch of time, that are given by the player during the game progress, so that the resume control unit 345 described above can reproduce the game progress during the stretch of time since the time wound back by a certain stretch of time until the passage stop time.

The RAM 103 can function as such an operation instruction storage unit 350.

The image information storage unit 360 stores various image information. For example, the image information storage unit 360 stores image information representing a background image of the game, balloon objects to be scrolled, etc.

A DVD-ROM to be mounted on the DVD-ROM drive 107 and the RAM 103 can function as such an image information storage unit 360.

The image generating unit 370 is controlled by the process control unit 340 to generate a game image, etc.

For example, the image generating unit 370 generates a game image in which balloon objects are displayed in a scrolling manner, a game image that represents stopped state of the game when it is suspended, or the like, and supplies the image to the display 290 in the form of an image signal so that the image can be displayed on the screen.

Figure 6:
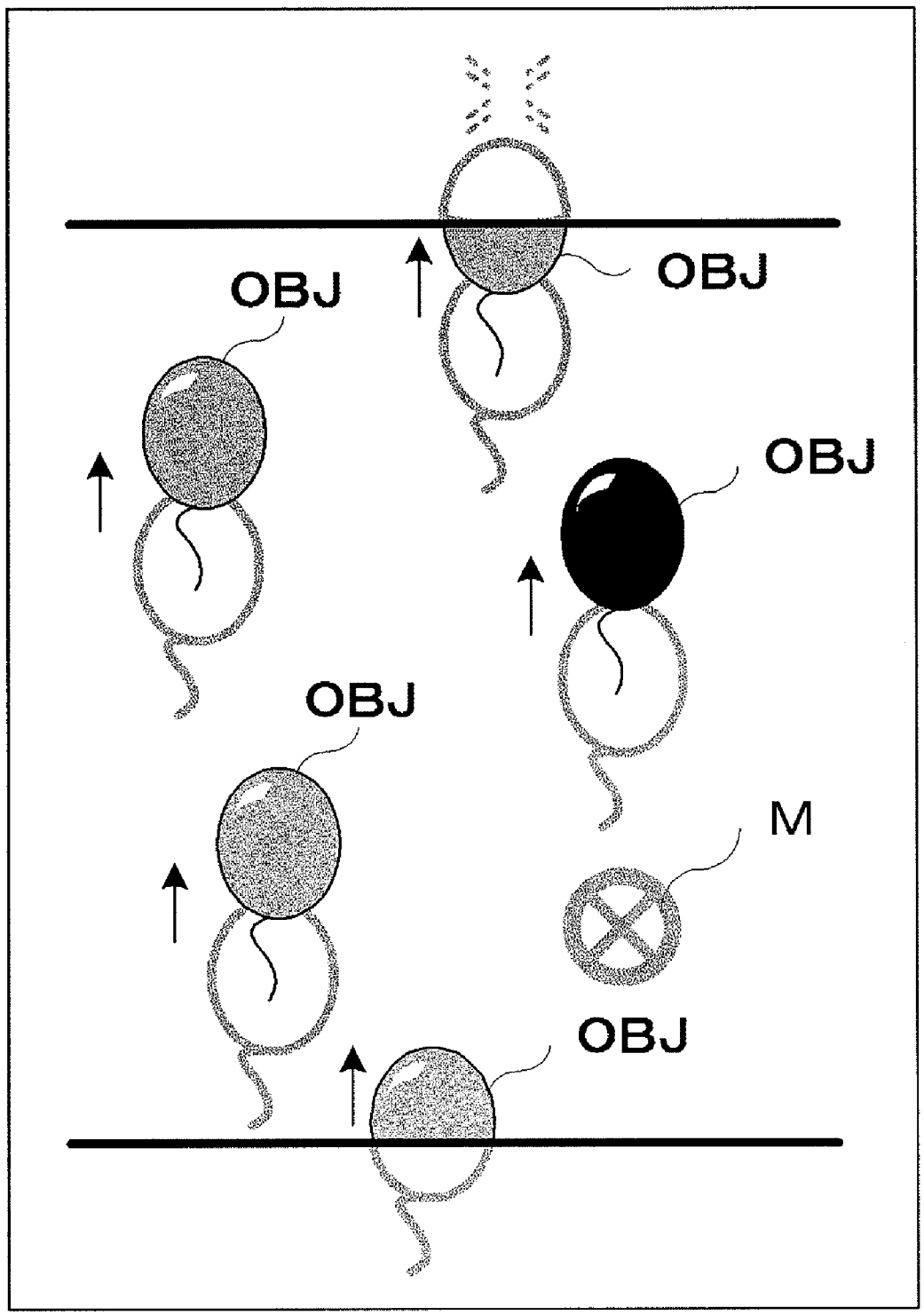
FIG. 6 is a schematic diagram showing an example game image to be displayed.

Specifically, the image generating unit 370 generates a display image as shown in FIG. 6. FIG. 6 shows a scene in which balloon objects OBJ successively appear from the bottom, move upward and disappear, and in which a sight mark M is displayed at a position which the player operates the controller 210 to point to.

The timings at which the balloon objects OBJ appear, the speed at which they move, the timing at which the color is changed, etc. are calculated based on the parameters generated by the parameter generating unit 341 described above and the passing time counted by the passing time counting unit 342.

The player keeps an eye on the moving balloon objects OBJ, and presses the "B" button 214 by aiming at a balloon object OBJ whose color has changed (by overlaying the sight mark M thereon), thereby gaining a scoring point.

The image processing unit 108 can function as such an image generating unit 370.

(Overview of the Operation of the Game Device)

Figure 7A:
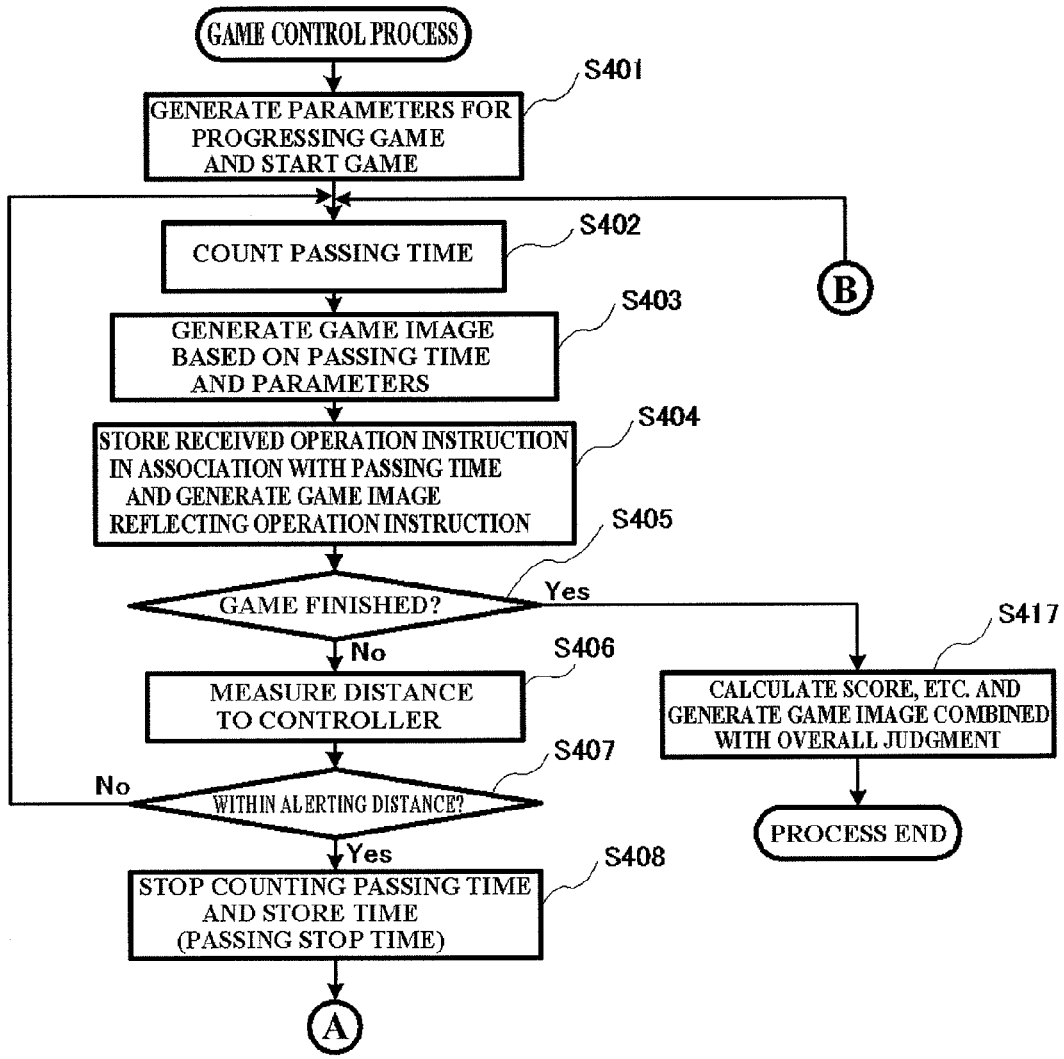
FIG. 7A is a flowchart for explaining a game control process according to an embodiment of the present invention.
Figure 7B:
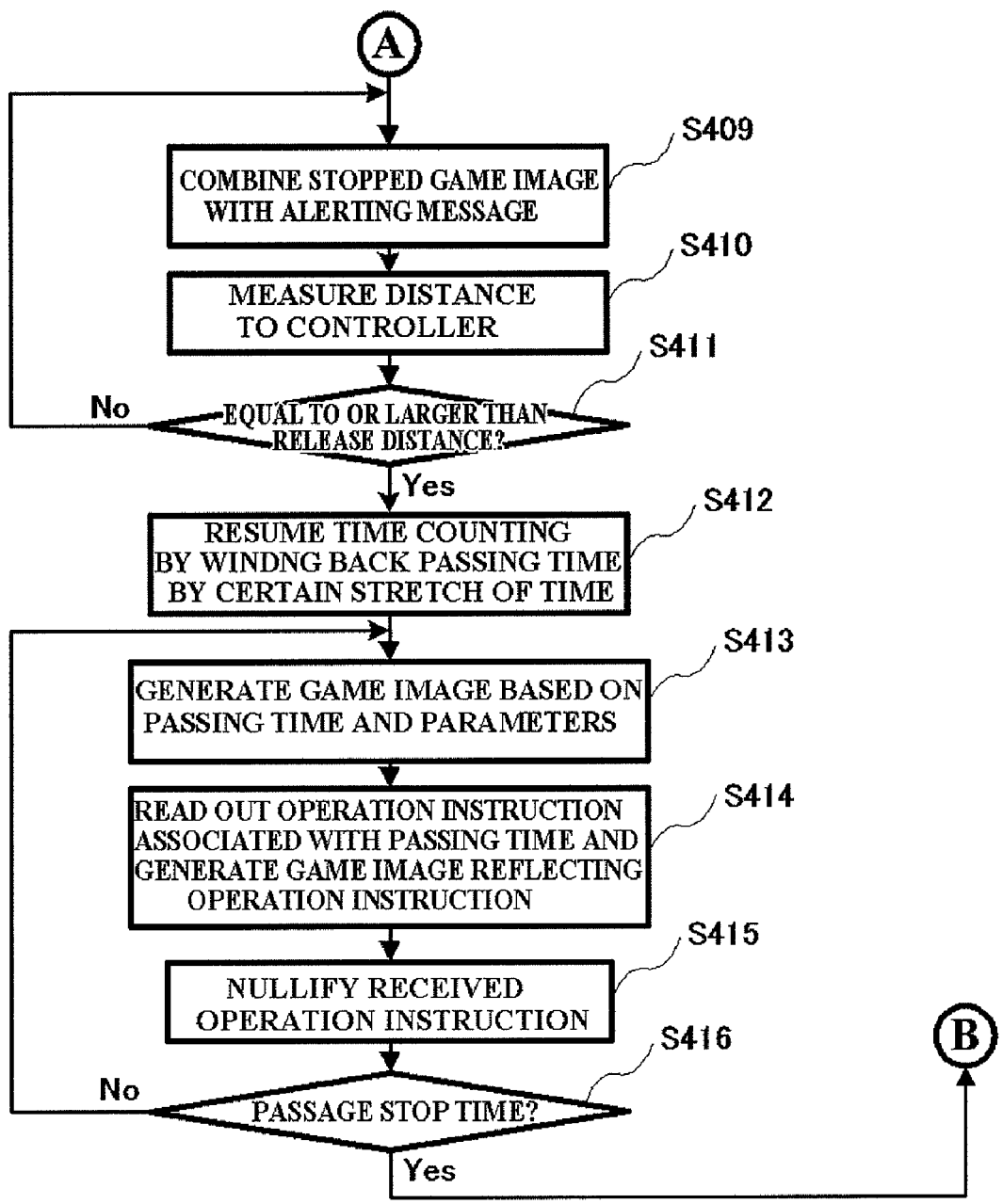
FIG. 7B is a flowchart for explaining a game control process according to an embodiment of the present invention.

FIG. 7 is a flowchart showing the flow of a game control process performed by the game device 300 having the configuration described above, while a sensory game is played. An operation of the game device 300 will be explained below with reference to this diagram.

For example, this game control process is started when a sensory game is played.

First, the game device 300 generates parameters for progressing the game, and starts the game (step S401). Specifically, the parameter generating unit 341 generates parameters such as the speed at which balloon objects are scrolled, the timing at which balloon objects appear, a choice of a balloon object whose color is to be changed, the timing at which the color is changed, etc.

The game device 300 counts the passing time (step S402). That is, the passing time counting unit 342 successively counts the passing time from the start of the game.

The game device 300 generates a game image based on the passing time and the parameters (step S403). The game device 300 stores a received operation instruction in association with the passing time, and generates a game image that reflects the operation instruction (step S404).

Figure 8A:
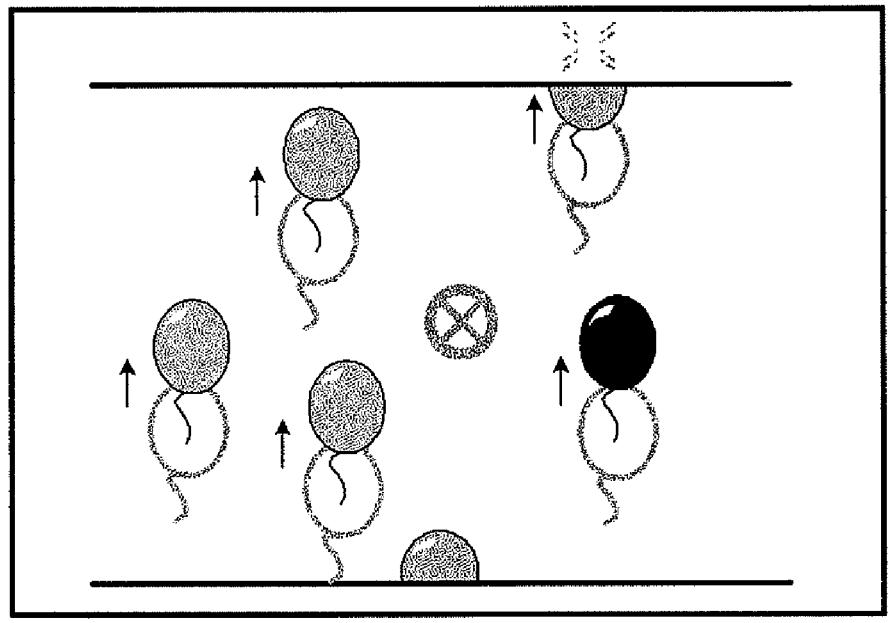
FIG. 8A is a schematic diagram showing an example of distance between a screen and a controller.
Figure 8A:
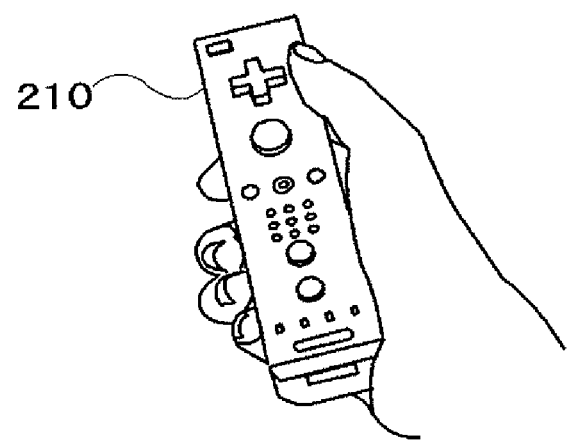

That is, the image generating unit 370 under the control of the process control unit 340 sequentially generates game images that progress from one to the next, according to the parameters and the content of operations made by the player to the controller 210, as shown in FIG. 8A.

The game device 300 determines whether or not the game is finished (step S405).

That is, the process control unit 340 determines whether or not the game is finished based on whether a clearing condition of the game is satisfied, whether a condition for the game to be over is satisfied, or the like.

In a case where it is determined that the game is finished (step S405; Yes), the game device 300 goes to step S417 described later.

On the other hand, in a case where it is determined that the game is not finished (step S405; No), the game device 300 measures the distance to the controller 210 (step S406).

That is, the distance measuring unit 343 sequentially measures the distance between the display 290 and the controller 210 based on position information sequentially acquired by the position information acquiring unit 320.

The game device 300 determines whether or not the measured distance is within the alerting distance (step S407). That is, the game device 300 determines whether or not the player has come too close to the display 290.

In a case where it is determined that the measured distance is not within the alerting distance (that the player is away from the display by more than the alerting distance) (step S407; No), the game device 300 returns to step S402 and repeatedly performs steps S402 to S407 described above.

On the other hand, in a case where it is determined that the measured distance is within the alerting distance (step S407; Yes), the game device 300 stops counting the passing time, and stores the time (stop time) (step S408). Then, the game device 300 combines the game image at the time of this stop with a predetermined alerting message (step S409).

Figure 8B:
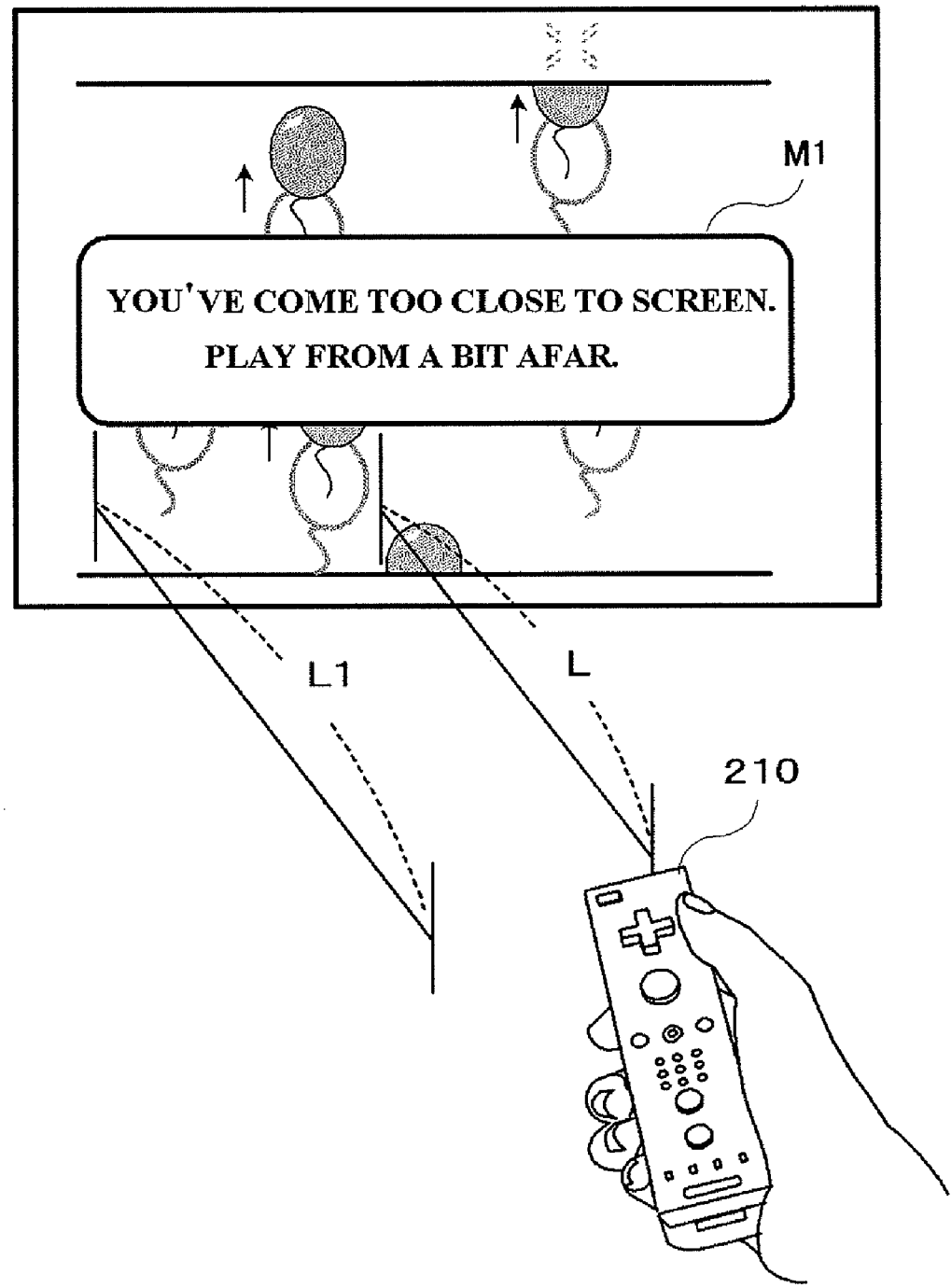
FIG. 8B is a schematic diagram showing an example of distance between a screen and a controller

That is, when the controller 210 has come close and shortened the distance L to be within the alerting distance L1 as shown in FIG. 8B, the suspension control unit 344 suspends the progress of the game and controls the image generating unit 370 to generate a game image obtained by combining the game image at the time of the stop with an alerting message M1.

The game device 300 measures the distance to the controller 210 (step S410). Then, the game device 300 determines whether the measured distance is equal to or larger than the release distance (step S411).

In a case where it is determined that the measured distance is neither equal to nor larger than the release distance (step S411; No), the game device 300 returns to step S409 and repeatedly performs steps S409 to S411 described above.

In a case where it is determined that the measured distance is equal to or larger than the release distance (step S411; Yes), the game device 300 winds back the passing time by a certain stretch of time, and resumes counting the time therefrom (step S412). Then, the game device 300 generates a game device based on the passing time and parameters (step S413). The game device 300 reads out an operation instruction associated with the passing time from the operation instruction storage unit 350, and generates a game image that reflects the read-out operation instruction (step S414). The game device 300 nullifies any received operation instruction (step S415).

The game device 300 determines whether or not the passing time has reached the stop time (step S416). That is, the game device 300 determines whether or not the certain stretch of time by which the time is rewound has passed and the time has come to the time at which the game was suspended.

In a case where it is determined that the passing time has not reached the stop time (step S416; No), the game device 300 returns to step S413 and repeatedly performs steps S413 to S416 described above.

That is, the resume control unit 345 compares the distance of the controller 210 that is measured after the progress of the game was suspended with the release distance, and in a case where the measured distance is equal to or larger than the release distance, resumes the progress of the game by rewinding back by a certain stretch of time. When the time is wound back, if the player can give a new operation from that time reached by rewinding, there occurs a problem that the game can progress in a different way from the way it did before the game was suspended. Therefore, the instruction information nullifying unit 346 nullifies any operation instruction from the controller 210 during the stretch of time from the wound-back time till the suspend time (passage stop time). Then, the resume control unit 345 reproduces the progress of the game based on the past operation instructions, etc. stored in the operation instruction storage unit 350.

The display format changing unit 347 appropriately changes the display format of the game screen while the instruction information nullifying unit 346 is nullifying operation instructions to notify the player that replaying is ongoing.

Figure 8C:
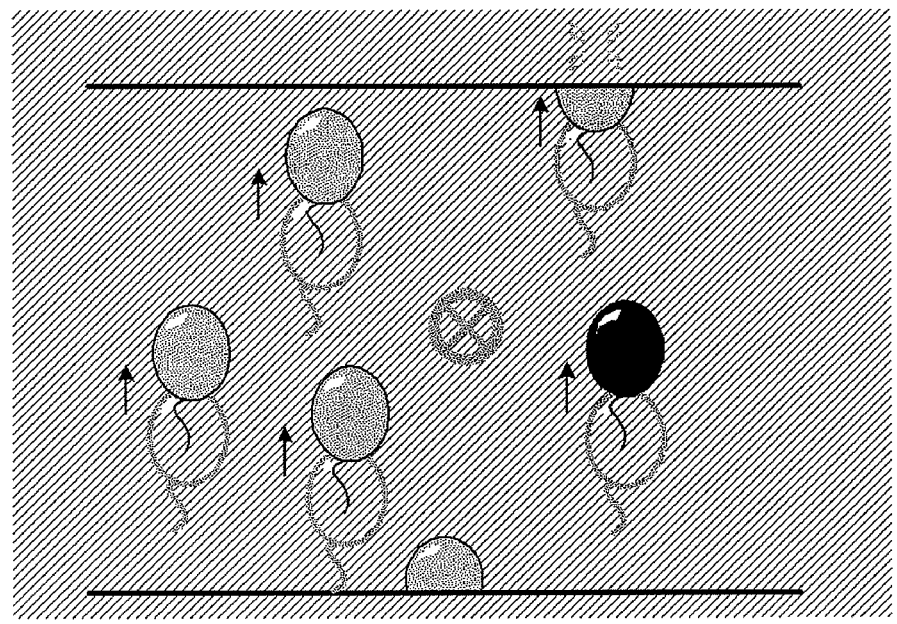
FIG. 8C is a schematic diagram showing an example display image.
Figure 8D:
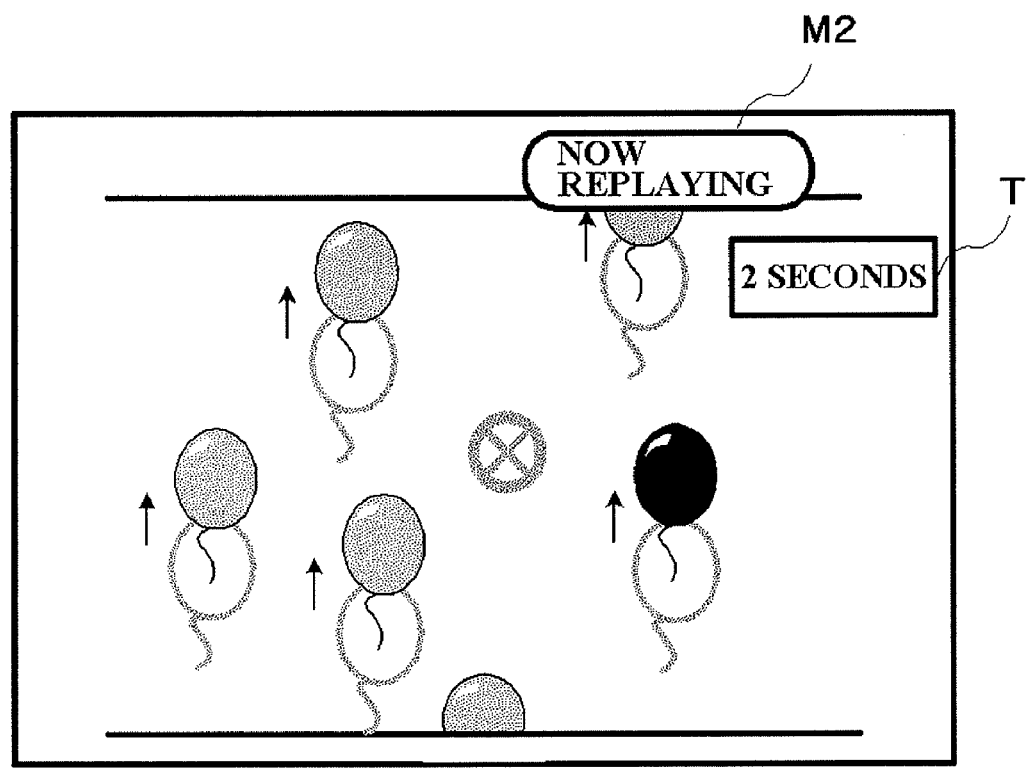
FIG. 8D is a schematic diagram showing an example display image.

For example, until before the passing time reaches the passage stop time, the display format changing unit 347 keeps the display format changed by darkening the game screen, etc. as shown in FIG. 8C to notify the player that the past progress is being reproduced. Other than this, the display format changing unit 347 may display a message M2 or the like that notifies that reproduction (replaying) is ongoing as shown in FIG. 8D, or may display a time T that remains until the passage stop time in a countdown manner.

On the other hand, in a case where it is determined that the passing time has reached the passage stop time (step S416;

Yes), the game device 300 returns to step S402 described above. That is, the game device 300 repeats steps S402 to S407 again.

That is, the game device 300 becomes open to receive operation instructions from the controller 210 so that the player can continue the game from the suspend time.

Then, when it is determined at step S405 described above that the game is finished, the game device 300 calculates the score, etc., and generates a game image that is combined with an overall judgment (step S417).

That is, the game device 300 generates a game image for evaluating the content of the operations by the controller 210 and presents it to the player.

This game control process suspends the progress of the game when the player operating the controller 210 has come too close to the display 290, to prohibit the player from going on with the game while the player remains in the same state.

Then, after the player goes sufficiently away from the display 290, the process resumes the progress of the game by rewinding the progress by a certain stretch of time. That is, because the progress of the game is resumed from slightly ahead of the suspension time, the player can grasp the situation before the progress was suspended and continue the game from the suspend time with no difficulty. In order that the progress of the game before the suspend time may not be changed, no new operation to the controller 210 by the player will be received until the time reaches the suspension time (stop time).

Hence, it is possible to appropriately prevent the player from coming too close to the display device.

Another Embodiment

The embodiment described above has explained a case where the requisite for the suspended progress of the game to be resumed is to come away by the release distance or farther, but the determining method for resuming the progress of the game is not limited to this but arbitrary.

For example, the time duration during which the player is away by more than the alerting distance may be counted, and if this time duration lasts for a certain stretch of time (a release period), the progress of the game may be resumed.

Figure 9:
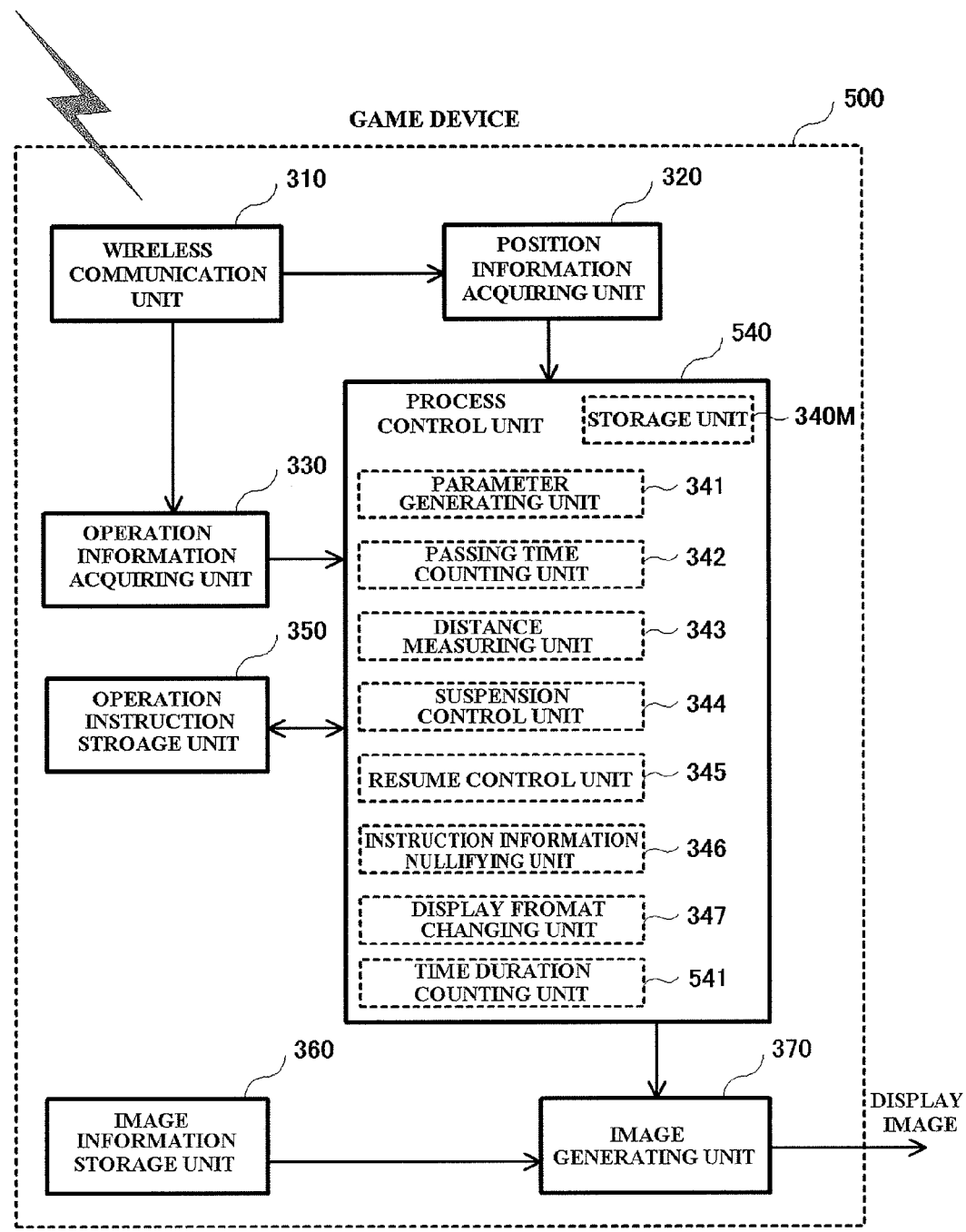
FIG. 9 is a schematic diagram showing a schematic configuration of a game device according to another embodiment of the present invention.

FIG. 9 is a schematic diagram showing a schematic configuration of a game device according to another embodiment of the present invention, which is characterized by resuming the progress of a suspended game by counting the time duration during which the player is away by more than the alerting distance.

This game device 500 includes a wireless communication unit 310, a position information acquiring unit 320, an operation information acquiring unit 330, an operation instruction storage unit 350, an image information storage unit 360, an image generating unit 370, and a process control unit 540.

The game device shown in FIG. 9 has the configuration of the game device 300 of FIG. 3 described above, except that it includes the process control unit 540 instead of the process control unit 340.

The process control unit 540 includes a storage unit 340M inside, and controls the whole game device 500. The process control unit 540 includes, for example, a parameter generating unit 341, a passing time counting unit 342, a distance measuring unit 343, a suspension control unit 344, a resume control unit 345, an instruction information nullifying unit 346, a display format changing unit 347, and a time duration counting unit 541.

The parameter generating unit 341 to the display format changing unit 347 are substantially the same as those in the configuration of FIG. 3 described above (any difference will be described later). The storage unit 340M stores at least an alerting distance.

The time duration counting unit 541 counts a time duration from zero in a case where the distance of the controller 210 that is measured by the distance measuring unit 343 after the progress of a game is suspended by the suspension control unit 344 is larger than the alerting distance.

When the distance of the controller 201 becomes equal to or smaller than the alerting distance while a time duration is counted, the counted time duration is reset to zero, and when the distance of the controller 210 recovers to larger than the alerting distance, time counting is restarted.

Then, the resume control unit 345 compares the time duration counted by the time duration counting unit 541 with a predetermined release period, and resumes the progress of the game in a case where the time duration has been counted for this release stretch of time. This release period may be stored in the storage unit 340M.

For example, in a case where the release stretch of time is prescribed as three seconds, the resume control unit 345 determines that the player has gone away from the display 290 when the time duration counting unit 541 has counted to three seconds, and resumes the progress of the game by rewinding the progress by a certain stretch of time as described above.

Also in this case, the progress of the game is suspended when the player operating the controller 210 has come too close to the display 290, to prohibit the player from continuing the game as long as the player is remaining in the same state.

Then, after confirmation of the player's having gone away from the display 290, the time is wound back by a certain stretch of time and the progress of the game is resumed. Because the progress of the game is resumed from slightly ahead of the suspend time, the player can grasp the situation before the game was suspended and continue the game from the suspend time with no difficulty.

Hence, it is possible to appropriately prevent the player from coming too close to the display device.

The embodiments described above have explained a sensory game as an example, but appropriate applications are available not only to such a sensory game but to games in which the position, etc. of a controller are measured and used as inputs.

The present application claims priority to Japanese Patent Application No. 2007-071781, the content of which is incorporated herein in its entirety.

INDUSTRIAL APPLICABILITY

As explained above, according to the present invention, it is possible to provide a game device, a progress control method, an information recording medium, and a program that can appropriately prevent a player from coming too close to a display device.

The invention claimed is:

1. A game device that progresses a game in accordance with an operation to a controller that is used by being pointed to a display device, comprising:
an image generating unit that sequentially generates a series of images of the game to be displayed on the display device;
a distance measuring unit that sequentially measures a distance between the display device and the controller;
a suspension control unit that suspends progress of the game when the measured distance becomes smaller than a first prescribed value and controls the image generating unit to generate and display an alert game image by combining the game image at the time of suspension with a predetermined alert message, the first prescribed value defining a minimum safe distance between the controller and the display device to reduce the chance the controller comes into contact with the display device; and a resume control unit that, when the distance measured after the progress is suspended becomes larger than a second prescribed value, resumes the progress of the game by rewinding the progress by a predetermined stretch of time from a time the progress of the game was suspended.

2. The game device according to claim 1, further comprising:

an instruction information receiving unit that sequentially receives instruction information from the controller; and an instruction information nullifying unit (346) that nullifies any received instruction information during a stretch of time from when the resume control unit resumes the progress of the game after once the suspension control unit suspended the progress until when the game progresses to the time its progress was suspended.

3. The game device according to claim 1, further comprising:

an image generating unit that sequentially generates an image of the game to be displayed on the display device; and a display format changing unit that changes a display format of an image to be generated, during a stretch of time from when the resume control unit resumes the progress of the game after once the suspension control unit suspended the progress until when the game progresses to the time its progress was suspended.

4. A game device according to claim 1, the first prescribed value being equal to the second prescribed value.

5. A game device according to claim 1, the second prescribed value being greater than the first prescribed value.

6. A game device that progresses a game in accordance with an operation to a controller that is used by being pointed to a display device, comprising:

an image generating unit that sequentially generates a series of images of the game to be displayed on the display device;

a prescribed value storage unit that stores a first prescribed value that defines a closest distance, which is a distance that exists between the display device and the controller when they get closest to each other, and a second prescribed value that is larger by a predetermined distance than the first prescribed value, the first prescribed value defining a minimum safe distance between the controller and the display device to reduce the chance the controller comes into contact with the display device;

a position information acquiring unit that sequentially acquires position information of the controller that is pointed to the display device;

a distance measuring unit that sequentially measures a distance between the display device and the controller based on the acquired position information;

a suspension control unit that suspends progress of the game when the measured distance becomes smaller than the stored first prescribed value and controls the image generating unit to generate and display an alert game image by combining the game image at the time of suspension with a predetermined alert message; and a resume control unit that, when the distance measured after the progress was suspended becomes larger than the stored second prescribed value, resumes the progress of the game by rewinding the progress by an amount that corresponds to a predetermined stretch of time from a time the progress was suspended.

7. A game device that progresses a game in accordance with an operation to a controller that is used by being pointed to a display device, comprising:

an image generating unit that sequentially generates a series of images of the game to be displayed on the display device;

a position information acquiring unit that sequentially acquires position information of the controller that is pointed to the display device;

a distance measuring unit that sequentially measures a distance between the display device and the controller based on the acquired position information;

a suspension control unit that suspends progress of the game when the measured distance becomes smaller than a first prescribed value and controls the image generating unit to generate and display an alert game image by combining the game image at the time of suspension with a predetermined alert message, the first prescribed value defining a minimum safe distance between the controller and the display device to reduce the chance the controller comes into contact with the display device;

a time counting unit that counts a time duration during which the distance measured after the progress was suspended is being larger than a second prescribed value; and a resume control unit that, in a case where the counted time duration lasts for a certain stretch of time, resumes the progress of the game by rewinding the progress by a predetermined stretch of time from a time the progress was suspended.

8. A game device according to claim 7, the first prescribed value being equal to the second prescribed value.

9. A game device according to claim 7, the second prescribed value being greater than the first prescribed value.

10. A progress control method for a game device that progresses a game in accordance with an operation to a controller that is used by being pointed to a display device, comprising:

an image generating step of sequentially generating a series of images of the game to be displayed on the display device, the first prescribed value defining a minimum safe distance between the controller and the display device to reduce the chance the controller comes into contact with the display device;

a distance measuring step of sequentially measuring a distance between the display device and the controller;

a suspend controlling step of suspending progress of the game when the measured distance becomes smaller than a first prescribed value;

generating and displaying an alert game image on the display by combining the game image at the time of suspension with a predetermined alert message; and a resume controlling step of, when the distance measured after the progress was suspended becomes larger than a second prescribed value, resuming the progress of the game by rewinding the progress by a predetermined stretch of time from a time the progress was suspended.

11. A progress control method according to claim 10, the first prescribed value being equal to the second prescribed value.

12. A progress control method according to claim 10, the second prescribed value being greater than the first prescribed value.

13. A non-transitory information recording medium that stores a program that controls a computer, which progresses a game in accordance with an operation to a controller that is used by being pointed to a display device, to function as:

an image generating unit that sequentially generates a series of images of the game to be displayed on the display device;

a distance measuring unit that sequentially measures a distance between the display device and the controller;

a suspension control unit that suspends progress of the game when the measured distance becomes smaller than a first prescribed value and controls the image generating unit to generate and display an alert game image by combining the game image at the time of suspension with a predetermined alert message, the first prescribed value defining a minimum safe distance between the controller and the display device to reduce the chance the controller comes into contact with the display device; and a resume control unit that, when the distance measured after the progress was suspended becomes larger than a second prescribed value, resumes the progress of the game by rewinding the progress by a predetermined stretch of time from a time the progress was suspended.

14. A non-transitory information recording medium according to claim 13, the first prescribed value being equal to the second prescribed value.

15. A non-transitory information recording medium to claim 13, the second prescribed value being greater than the first prescribed value.

* * * * *

UNITED STATES PATENT AND TRADEMARK OFFICE
CERTIFICATE OF CORRECTION

PATENT NO.       : 8,298,082 B2
APPLICATION NO.  : 12/531857
DATED            : October 30, 2012
INVENTOR(S)      : Yuichi Asami It is certified that error appears in the above-identified patent and that said Letters Patent is hereby corrected as shown below:

Column 17, line 20: Delete "(346)"

Signed and Sealed this
Twenty-second Day of January, 2013

David J. Kappos
*Director of the United States Patent and Trademark Office*